United States Patent Office 2,944,094
Patented July 5, 1960

2,944,094

PURIFICATION OF OLEFINS SELECTIVE HYDROGENATION OF MONOSUBSTITUTED 1-OLEFINS WITH A RUTHENIUM CATALYST

Paul N. Rylander and Lewis M. Berkowitz, Newark, N.J., assignors to Engelhard Industries, Inc., Newark, N.J., a corporation of New Jersey No Drawing. Filed Dec. 23, 1958, Ser. No. 782,391

8 Claims. (Cl. 260—677)

This invention relates to a process for the purification of olefins and, more particularly, to a process in which a monosubstituted 1-olefin is selectively hydrogenated in the presence of more highly substituted olefins, using a ruthenium catalyst.

Olefins of similar structure and molecular weight are very difficult to separate from each other. For example, octene-1 and octene-2 have close boiling points of 250 and 258° F., respectively, which makes the separation of these olefins by fractional distillation a difficult and tedious task. Other separation processes such as fractional crystallization, selective extraction, selective absorption, and the like, are, because of the similar properties of the two compounds, also difficult. These considerations apply to any mixture of olefins of similar structure.

In accordance with the present invention, it has been found that ruthenium catalyst demonstrates a very high degree of selectivity in that it hydrogenates some olefins rapidly and others not at all. For example, octene-1 can be selectively hydrogenated to octane, and removal of octane from octene-2 is a comparatively easy task. Generally speaking, in the process of the invention, mixtures of olefins are contacted with a ruthenium catalyst in the presence of hydrogen, the hydrogen being present in a quantity sufficient to completely hydrogenate the 1-olefin present in the mixture. Among the types of olefins which may be separated by the process of the invention are:

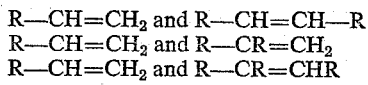

in which R may be any of a number of different radicals such as alkyl, aralkl, aryl, heterocyclic, hydroxy-alkyl, ester radicals, and the like. Exemplary of the compounds which may be separated are 1-octene from 2-octene; 1-octene from cyclohexene; 4-methyl-1-pentene from cyclohexene; 4-methyl-1-pentene from 2-octene; 1-octene from 2-methyl-1-pentene; 3-methyl-1-pentene from 2-methyl-1-pentene; 1-octene from 2-methyl-2-pentene; 4-methyl-1-pentene from 2-methyl-2-pentene; allyl benzene from α-methyl-styrene; vinyl cyclohexane from 1,2-dicyclohexyl-ethylene; 3-vinyl-pyridine from 1-(3-pyridyl)-propene; 1-butene-4-ol from 2-methyl-1-butene-4-ol; and acrylic acid from crotonic acid. In each of these cases, the compound possessing the vinyl group is preferentially hydrogenated.

The catalyst which is employed in the process of the present invention is ruthenium, either in the form of sponge or supported on a carrier, suitable carriers being carbon, activated alumina, kieselguhr, diatomaceous earth and the like.

The concentration range of catalyst, expressed as ruthenium metal weight percent of substrate treated, is in the range of about 0.01 to 1 percent, preferably about 0.1 percent by weight. The ruthenium metal, when supported, may constitute about 0.1 to 50 percent by weight of the total weight of ruthenium metal and support. The ruthenium may be deposited on a suitable support by a conventional method of hydrolysis of a soluble salt of ruthenium and reduction of the ruthenium compound to metal.

The hydrogenation is generally performed in the presence of water as a solvent, and the water may be present in the range of about 1 to 99 percent by weight of the substrate, i.e. the olefins, preferably 10 to 90 percent by weight of the substrate.

The reaction temperature may be in the range of about 0° C. to 200° C., the water being maintained in the liquid phase by the utilization of superatmospheric pressure, if necessary. A preferred temperature range is about 20 to 35° C.

Reaction pressure may be in the range of subatmospheric to about 2000 p.s.i.g. Hydrogenation is favored by an increase in pressure; however, good selectivity together with activity is generally obtained at relatively low pressures, i.e. between atmospheric and 200 p.s.i.g., so that higher reaction pressures afford no process advantages.

The reaction time is dependent upon the catalyst concentration, pressure and temperature, but generally is in the range of a few minutes to a week, or more. The product may be analyzed by passing infrared rays through a 10 percent solution of the product in carbon tetrachloride.

The invention will be further illustrated by reference to the following specific example:

EXAMPLE I

A series of competitive reductions was performed and in each case where a monosubstituted 1-olefin was one of the substrates, exclusive reduction of the monosubstituted olefin occurred. The infrared spectrum of the reduction product was that of the unreduced multiple-substituted olefin and the saturated hydrocarbon derived from the mono-substituted olefin. The catalyst, under the conditions employed, showed no specificity toward mixtures of di- and tri-substituted olefins, or toward mixtures of symmetrically and unsymmetrically substituted olefins. The catalyst used in all of the experiments was 5 percent ruthenium supported on carbon powder; the carbon powder had an average particle size of 20 microns and was prepared by activation with hot gases of charcoal obtained from pine wood stumps.

The reaction procedure was as follows:

100 ml. of water, 500 mg. of 5 percent ruthenium on carbon, and equimolar quantities of olefins were charged to a Parr shaking hydrogenation apparatus. In the case of octene-1 and octene-2, for example, 10 ml. (0.064 mole) of each olefin was charged to the Parr apparatus. The Parr apparatus was then pressured with hydrogen to 42 p.s.i.g. and shaken at a temperature of 32° C. After an induction period of 2 hours, during which no hydrogen was absorbed, 0.064 mole of hydrogen was taken up in a period of 20 minutes and, during this period, the temperature rose from 32 to 35° C. The shaker was then stopped, the reaction mixture filtered, the aqueous layer saturated with sodium chloride and the organic layer was separated and dried over sodium sulfate. In the case of octene-1 and octene-2, the infrared spectrum of the product was identical with one of a equimolar mixture of octane and octene-2. All other hydrogenations followed the same general procedure except that in some cases the catalyst was shaken in the presence of hydrogen for one hour prior to adding the substrates. This prereduction is not absolutely necessary, but it eliminates a long induction period. The results are as follows:

*Table I*

[Selective olefin hydrogenation with Ru catalysts (comparison of hydrogenation of tenth-molar pairs of olefins, carried out until a tenth of a mole of hydrogen was taken up. The reaction products were analyzed by comparison of infrared spectra with standards).]

| Reaction Type | Run No. | Compounds Compared | Result |
|---|---|---|---|
| $R-CH=CH_2$ and $R-CH=CH-R$ | 1 | 1-octene vs. 2-octene | no vinyl left. |
| | 2 | 1-octene vs. cyclohexene | Do. |
| | 3 | 4-methyl-1-pentene vs. cyclohexene | Do. |
| | 4 | 4-methyl-1-pentene vs. 2-octene | Do. |
| $R-CH=CH_2$ and $R-CR=CH_2$ | 5 | 1-octene vs. 2-methyl-1-pentene | Do. |
| | 6 | 4-methyl-1-pentene vs. 2-methyl-1-pentene | Do. |
| $R-CH=CH_2$ and $R-CR=CHR$ | 7 | 1-octene vs. 2-methyl-2-pentene | Do. |
| | 8 | 4-methyl-1-pentene vs. 2-methyl-2-pentene | Do. |
| $\begin{array}{c}R\\ \diagdown\\ C=CH_2\\ \diagup\\ R\end{array}$ and $R-CH=CH-R$ | 9 | 2-methyl-1-pentene vs. cyclohexene | no selectivity. |
| | 10 | 2-methyl-1-pentene vs. 2-octene | Do. |
| $\begin{array}{c}R\\ \diagdown\\ C=CH_2\\ \diagup\\ R\end{array}$ and $R-CH=CRR$ | 11 | 2-methyl-1-pentene vs. 2-methyl-2-pentene | Do. |
| $R-CH=CHR$ and $R-CH=CRR$ | 12 | Cyclohexene vs. 2-methyl-2-pentene | Do. |
| | 13 | 2-octene vs. 2-methyl-2-pentene | Do. |
| $R-CH=CH-R$ and $R-CH=CH-R$ | 14 | 2-octene vs. cyclohexene | Do. |

It will be obvious to those skilled in the art that many modifications may be made within the scope of the present invention without departing from the spirit thereof, and the invention includes all such modifications.

What is claimed is:

1. A process for the selective hydrogenation of a monosubstituted 1-olefin, containing a single substituent which is non-reactive under the reaction conditions, in admixture with a more highly substituted olefin which comprises contacting the mixture of olefins with a ruthenium catalyst in the presence of hydrogen.

2. A process according to claim 1 in which the reaction is conducted in the liquid phase.

3. A process according to claim 1 in which the reaction is conducted at a temperature in the range of about 0° C. to 200° C.

4. A process according to claim 1 in which the pressure is in the range of subatmospheric to about 2000 p.s.i.g.

5. A process for the selective hydrogenation of a monoalkyl-substituted 1-olefin in admixture with a more highly substituted olefin which comprises contacting the mixture of olefins with a ruthenium catalyst in the presence of hydrogen.

6. A process according to claim 5 in which the reaction is conducted in the liquid phase.

7. A process according to claim 5 in which the reaction is conducted at a temperature in the range of about 0° C. to 200° C.

8. A process according to claim 5 in which the pressure is in the range of subatmospheric to about 2000 p.s.i.g.

References Cited in the file of this patent

UNITED STATES PATENTS 2,342,074    Deanesly et al.     Feb. 15, 1944

OTHER REFERENCES

Lebedev et al.: J. Chem. Soc., vol. 127, pp. 417–440 (1925) (only pages 428, 434 and 439 are relied on).

Sheridan et al.: J. Chem. Soc. (1952), pp. 2962–2966 (only pages 2962 and 2963 are relied on).